(12) United States Patent
Collins et al.

(10) Patent No.: US 7,882,565 B2
(45) Date of Patent: Feb. 1, 2011

(54) CONTROLLED ACCESS TO OBJECTS OR AREAS IN AN ELECTRONIC DOCUMENT

(75) Inventors: Nathalie Sophia Collins, Sunnyvale, CA (US); Shawn Villaron, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 296 days.

(21) Appl. No.: 11/218,944

(22) Filed: Sep. 2, 2005

(65) Prior Publication Data

US 2007/0056045 A1    Mar. 8, 2007

(51) Int. Cl.
G06F 7/04   (2006.01)
G06F 17/30  (2006.01)

(52) U.S. Cl. .............. 726/27; 726/26; 726/28; 713/182; 707/781; 715/741

(58) Field of Classification Search .......... 713/182; 726/2, 27; 715/741
See application file for complete search history.

(56) References Cited

U.S. PATENT DOCUMENTS

| | | | |
|---|---|---|---|
| 5,590,266 A * | 12/1996 | Carson et al. | 715/741 |
| 5,745,910 A * | 4/1998 | Piersol et al. | 715/210 |
| 6,289,382 B1 * | 9/2001 | Bowman-Amuah | 709/226 |
| 6,321,334 B1 * | 11/2001 | Jerger et al. | 726/1 |
| 6,615,199 B1 * | 9/2003 | Bowman-Amuah | 706/50 |
| 7,181,679 B1 * | 2/2007 | Taylor | 715/234 |
| 7,272,815 B1 * | 9/2007 | Eldridge et al. | 717/101 |
| 7,369,279 B2 * | 5/2008 | Van Oosterhout | 358/1.13 |
| 7,515,717 B2 * | 4/2009 | Doyle et al. | 380/277 |
| 2002/0091700 A1 * | 7/2002 | Steele et al. | 707/100 |
| 2002/0099947 A1 * | 7/2002 | Evans | 713/193 |
| 2002/0143735 A1 * | 10/2002 | Ayi et al. | 707/1 |
| 2002/0191035 A1 * | 12/2002 | Selent | 345/866 |
| 2003/0023677 A1 * | 1/2003 | Morison Zuill et al. | 709/203 |
| 2003/0058277 A1 * | 3/2003 | Bowman-Amuah | 345/765 |
| 2003/0105950 A1 * | 6/2003 | Hirano et al. | 713/100 |
| 2003/0206189 A1 * | 11/2003 | DeMello et al. | 345/711 |
| 2004/0125402 A1 * | 7/2004 | Kanai et al. | 358/1.15 |
| 2004/0139396 A1 * | 7/2004 | Gelernter et al. | 715/515 |
| 2004/0179220 A1 * | 9/2004 | Van Oosterhout | 358/1.13 |
| 2004/0194026 A1 * | 9/2004 | Barrus et al. | 715/515 |
| 2005/0008163 A1 * | 1/2005 | Leser et al. | 380/281 |
| 2005/0081043 A1 * | 4/2005 | Evans et al. | 713/182 |
| 2005/0138110 A1 * | 6/2005 | Redlich et al. | 709/201 |
| 2005/0223315 A1 * | 10/2005 | Shimizu et al. | 715/512 |
| 2005/0235216 A1 * | 10/2005 | Kawano | 715/751 |

(Continued)

FOREIGN PATENT DOCUMENTS

JP    11224222 A  *  8/1999

OTHER PUBLICATIONS

Frye Curtis, "Excel Annoyance," Dec. 28, 2004, O'Reilly Media Inc., Chapter 8.*

(Continued)

*Primary Examiner*—Michael Pyzocha
*Assistant Examiner*—Luu Pham
(74) *Attorney, Agent, or Firm*—Merchant & Gould (57) ABSTRACT

Methods, systems, and computer products provide for designating areas or objects in an electronic document as controlled access regions for prohibiting or limiting access to the regions and/or for limiting application functionalities that may be utilized in the regions.

19 Claims, 5 Drawing Sheets

U.S. PATENT DOCUMENTS

| | | | |
|---|---|---|---|
| 2005/0246283 A1* | 11/2005 | Gwiazda et al. | 705/52 |
| 2005/0288939 A1* | 12/2005 | Peled et al. | 705/1 |
| 2005/0289127 A1* | 12/2005 | Giampaolo et al. | 707/3 |
| 2006/0070113 A1* | 3/2006 | Bhagwat et al. | 726/2 |
| 2006/0080316 A1* | 4/2006 | Gilmore et al. | 707/9 |
| 2006/0080432 A1* | 4/2006 | Spataro et al. | 709/224 |
| 2006/0080535 A1* | 4/2006 | Elazar et al. | 713/176 |
| 2006/0149567 A1* | 7/2006 | Muller et al. | 705/1 |
| 2006/0225137 A1* | 10/2006 | Odins-Lucas et al. | 726/27 |

OTHER PUBLICATIONS

Boot et al., "Special Edition Using Microsoft Office XP," May 22, 2001, Que.*

* cited by examiner

CONTROLLED ACCESS TO OBJECTS OR AREAS IN AN ELECTRONIC DOCUMENT

BACKGROUND

With the advent of the computer age, computer and software users have grown accustomed to user-friendly software applications that help them write, calculate, organize, prepare presentations, send and receive electronic mail, make music, and the like. For example, modern electronic word processing applications allow users to prepare a variety of useful documents. Modern spreadsheet applications allow users to enter, manipulate, and organize data. Modern electronic slide presentation applications allow users to create a variety of slide presentations containing text, pictures, data or other useful objects. Modern database applications allow users to store, organize and exchange large amounts of data.

In many electronic documents, certain objects or areas are provided for which document authors and/or managers desire access control. For example, all pages of an electronic document, for example, a word processing document, a spreadsheet document, a slide presentation document, and the like, may be labeled with a legal disclaimer by the document author, and the document author and/or manager may desire that no subsequent user be allowed to access and alter or otherwise edit the legal disclaimer. Similarly, an object in a document, for example, a picture object, a text object, a data table object, and the like, may contain information such as a company logo, document retention or tracking data, or sensitive company or institution data that should not be accessed and/or changed by subsequent users of the electronic document.

In many organizations, control of such areas or objects in electronic documents is managed through education of users as to the importance of not altering certain areas or objects in organization documents. In some cases, document templates are utilized in a given organization, and all users are educated as to those areas or objects in a given template that should not be altered. In other situations, some organizations utilize employees for manually auditing organization documents from time-to-time to ensure that certain areas or objects of the organization's electronic documents are not altered. Such methods are often not effective because users of the documents may accidentally or even intentionally alter controlled document areas or objects despite the wishes of the document authors and/or managers.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing methods, systems, and computer products for controlling access to designated areas or objects in an electronic document. According to aspects of the invention, a given area or object in an electronic document is designated as a controlled access region. Properties may be set on the controlled access region for prohibiting any access to the region by subsequent users. Alternatively, access may be granted to certain users via password protection or other suitable means for identifying a user as having permission to access a controlled access region.

According to another aspect of the invention, properties may be set on controlled access regions for limiting or disabling certain application functionalities that may be utilized in or on the region. According to this aspect, certain application functionalities, for example, formatting functionalities may be allowed for use against the controlled access region while other functionalities, for example, text entry and/or delete, or copy functionalities, may be disabled altogether.

According to another aspect of the invention, a controlled access region may be identified to users by a number of methods, for example, graying out the controlled access region, providing a cover screen over the region, and the like. In addition, information as to the nature of the controlled access region and help functionality associated with the controlled access region may be deployed to users upon selection or focus on a given controlled access region.

These and other features and advantages, which characterize the present invention, will be apparent from a reading of the following detailed description and a review of the associated drawings. It is to be understood that both the foregoing general description and the following detailed description are explanatory only and are not restrictive of the invention as claimed.

DETAILED DESCRIPTION

As briefly described above, embodiments of the present invention are directed to methods, systems, and computer products for designating areas of or objects in an electronic document as controlled access regions for prohibiting or limiting access to the regions and/or for limiting application functionalities that may be utilized in the regions. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
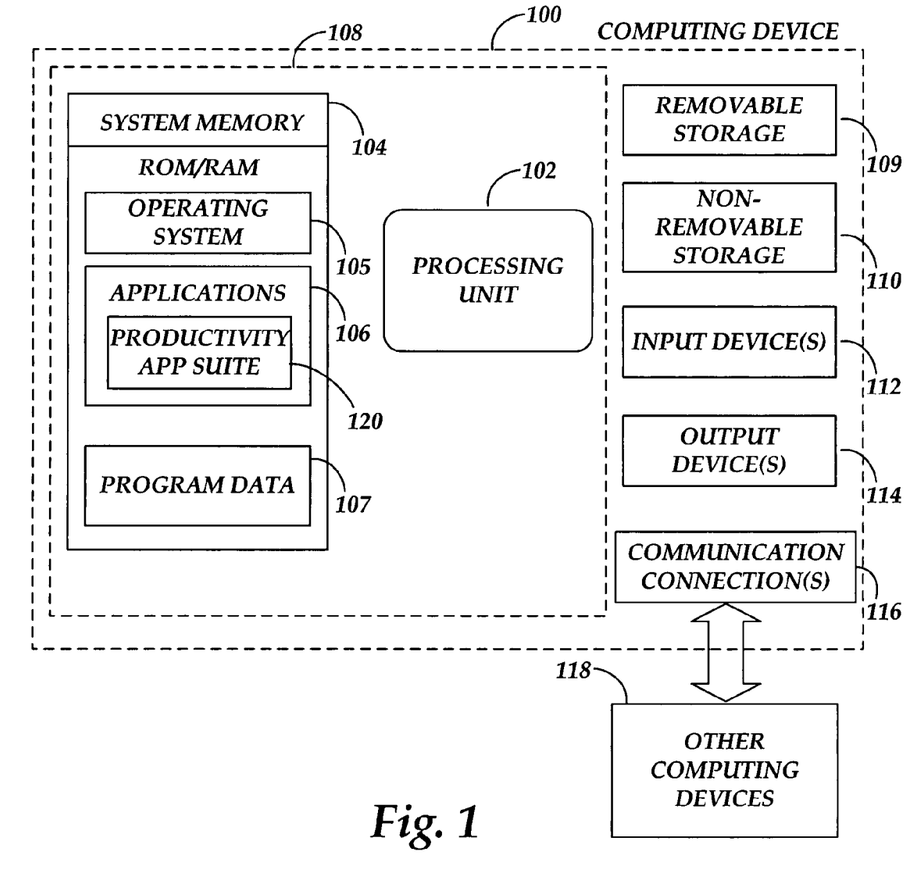
FIG. 1 illustrates an exemplary computing operating environment for embodiments of the present invention.

Referring now to the drawings, in which like numerals refer to like elements through the several figures, aspects of the present invention and an exemplary computing operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the invention may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system for implementing the invention includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS® operating systems from MICROSOFT CORPORATION of Redmond, Wash. The system memory 104 may also include one or more software applications 106, 120 and may include program data 107. This basic configuration is illustrated in FIG. 1 by those components within dashed line 108.

According to embodiments of the invention, the application 106 may comprise many types of programs, such as an electronic mail program, a calendaring program, an Internet browsing program, and the like. An example of such programs is OUTLOOK® manufactured by MICROSOFT CORPORATION. An application 120 is illustrated and may include a number of different software applications including a multiple-functionality software application for providing many other types of functionalities. Such a multiple-functionality application may include a number of program modules, such as a word processing program, a spreadsheet program, a slide presentation program, a database program, and the like. An example of such a multiple-functionality application is OFFICE™ manufactured by MICROSOFT CORPORATION. According to embodiments of the present invention, the applications 106, 120 are illustrative of any software application with which an electronic document may be created or edited that may contain areas or objects designated as controlled access regions according to the present invention.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
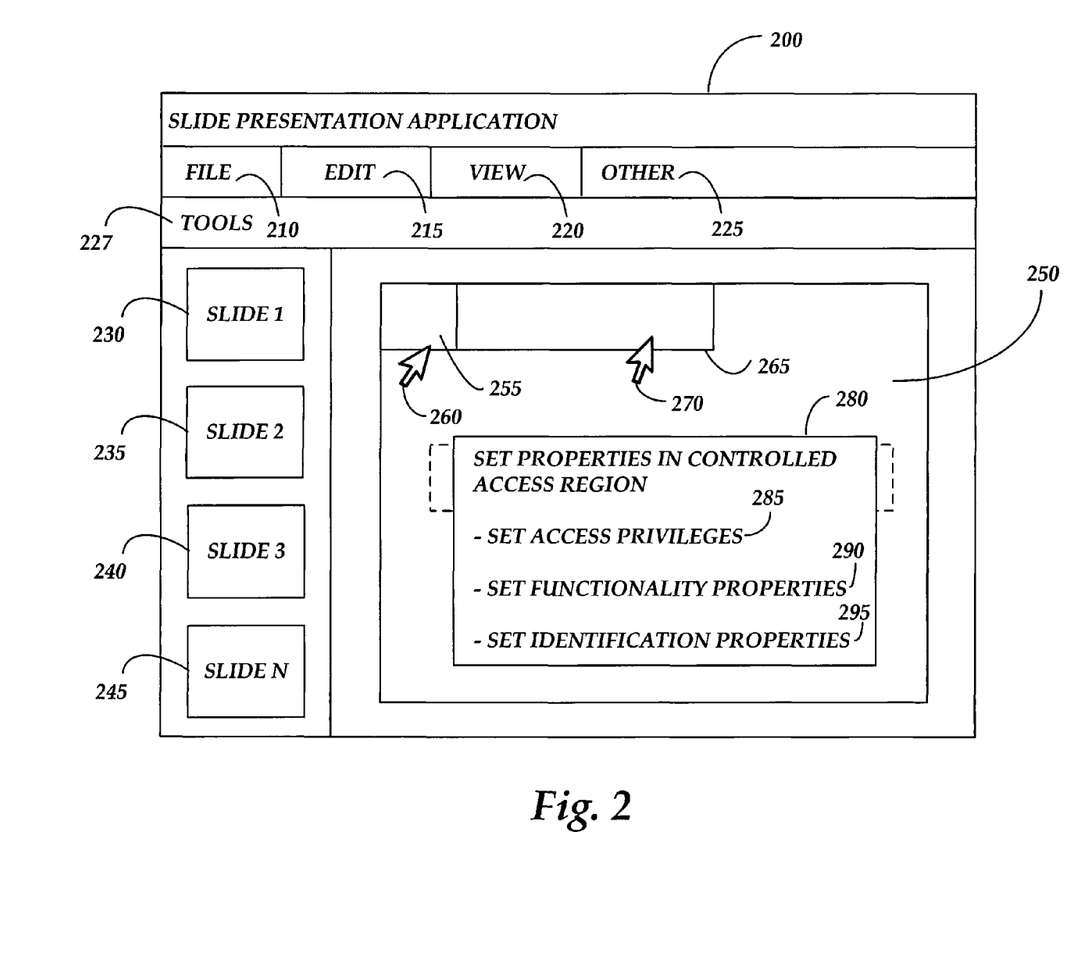
FIG. 2 illustrates a computer screen display of an example slide presentation application user interface for showing operation of an embodiment of the present invention.

According to embodiments of the present invention, one or more areas and/or objects in an electronic document may be designated as a controlled access region. As described in detail below, once an area or object in an electronic document is designated as a controlled access region, properties may be set on the region to identify the location of the region for distinguishing user accessible space in an electronic document from controlled space (controlled access region), for denying any subsequent access to the region, for allowing limited access to the region, for controlling software functionality that may be applied to the region, and for surfacing identification information and support information for the region. FIG. 2 illustrates a computer screen display of an example slide presentation application user interface for showing operation of an embodiment of the present invention. As should be appreciated, the example slide presentation application user interface and workspace illustrated in FIG. 2 is for purposes of example and illustration only. That is, embodiments of the present invention are equally applicable to other electronic documents, for example, word processing documents, spreadsheet documents, desktop publishing application documents, and the like. The description of embodiments of the present invention with respect to the example slide presentation application document illustrated in FIG. 2 is used to show by way of example the designation of an area or object in an electronic document as a controlled access region, and thus, description of the invention with respect to a slide presentation application document is not to be taken in a limiting sense or restrictive in any way of the invention as claimed herein.

Referring to FIG. 2, the slide presentation application user interface 200 includes a variety of functionality buttons including a File button 210, an Edit button 215, a View button 220, and an Other button 225 for utilizing the functionalities of the slide presentation application with respect to a slide presentation document 250 illustrated in the work space of the slide presentation application user interface 200. A Tools button 227 is also illustrated for accessing additional functionalities of the application. Along the left-hand side of the user interface 200 is a gallery of thumbnail representations of slides 1-N comprising an example slide presentation being created and/or edited in the slide presentation application user interface 200. In the workspace of the slide presentation application user interface 200, an electronic document in the form of a slide 250 is illustrated. As is well-known to those skilled in the art, the slide 250 may be populated with various forms of data and/or objects, for example, picture objects, clip art objects, and the like, for creating a useful slide in a slide presentation.

According to embodiments of the present invention, one or more areas or objects in an electronic document 250 may be designated as controlled access regions. According to one embodiment, a document author and/or manager may utilize an authoring tool provided by the software application 106, 120, for example, a slide presentation application, word processing application, spreadsheet application, and the like, for designating one more areas or objects in a given electronic document as a controlled access region. According to this embodiment, a controlled access authoring tool may be selected, for example, by selecting the Tools button 227, for displaying one or more software tools available for use with respect to the electronic document 250. According to one embodiment, the document author may first select an area of the electronic document 250, such as the area 255 or the area 265 that the author desires to designate as a controlled access region. For example, the document author may wish that the area 255 be designated as a controlled access region for containing organization or company document control or tracking information. The area 265 may be desired as a controlled access region for containing a legal disclaimer. As should be understood, those areas or objects outside designated controlled access regions may be considered non-controlled access regions unless they are otherwise controlled in some manner.

According to one embodiment, a given area or object may be designated as a controlled access region by clicking on or otherwise selecting an area in the document, for example, by the mouse cursor 260 or other pointing device, and by drawing a box-shaped region in the document that will serve as a controlled access region. According to this embodiment, such a region represents "negative" space in the document to which access by subsequent users is controlled. As should be appreciated, other box-shaped controlled access regions may be drawn on the electronic document 250 as desired by the document author and/or manager. For example, a controlled access region may be established in the lower right-hand corner or other location of the electronic document 250 for containing other controlled information. As should be appreciated, other shapes, including circular shapes, oval shapes, multi-sided shapes, irregular shapes, etc. may be drawn by a user for designation as a controlled access region. Description of the present invention in terms of box-shaped controlled access regions is for purposes of example and is not limiting of the invention as claimed.

As described above, embodiments of the present invention are equally applicable to other types of electronic documents, for example, word processing documents and spreadsheet documents. For example, the electronic document 250 illustrated in FIG. 2 may be in the form of a word processing document such as a memorandum, letter, manuscript, and the like. If it is desired that a given portion of the text of such a word processing document be designated as a controlled access region, a document author and/or manager may designate the desired portion as a controlled access region, as described herein. For example, a word processing document, such as a contract, may contain one or more "boilerplate" paragraphs that should not be changed or altered by subsequent users or editors. According to embodiments of the present invention, the document author and/or manager may designate these paragraphs as controlled access regions in the document to prohibit or limit subsequent access to those portions of the document. In the case of a spreadsheet document, a table of data may be designated as a controlled access region so that subsequent users may not edit or otherwise alter data contained in the table.

As briefly described above, in addition to designating a given area of an electronic document as a controlled access region, individual objects, for example, text objects, picture objects, data objects, and the like, may be designated as controlled access regions. For example, if an electronic document contains a picture object that should not be altered, edited, or otherwise changed by subsequent users of the electronic document, the picture object may be selected by the document author/manager for designation as a controlled access region in the associated electronic document. Likewise, a table object in a spreadsheet application document may be designated as a controlled access region so that subsequent users may not change data contained in the table object. Thus, according to embodiments of the present invention, individual objects contained in an electronic document may be designated as controlled access regions, or individual areas of an electronic document may be designated as controlled access regions by drawing or otherwise selecting a prescribed area in the electronic document for designation as a controlled access region.

Referring still to FIG. 2, according to embodiments of the present invention, once an area or object in an electronic document 250 has been selected for designation as a controlled access region, as described above, properties may be set on the designated region for specifying the types of access that may be allowed to the designated controlled access region by subsequent users and for applying identification and help information to the designated controlled access region. According to one embodiment of the present invention, once a given area or object is selected for designation as a controlled access region, a user interface 280, such as a dialog box, pop-up menu, drop-down menu, or any other suitable user interface component for providing selectable functionalities, as described herein, is provided for allowing the document author and/or manager to set one or more access control properties on the designated controlled access region.

Referring to the user interface 280, a first property that may be set on a designated controlled access region includes an access property. By selecting the Set Access button or control 285, the document author and/or manager may be provided additional user interface components for setting a variety of access properties on the designated controlled access region. For example, the document author may specify that access to a designated controlled access region is prohibited by any subsequent users. That is, the document author may stipulate that no access to a given controlled access region is granted to any subsequent users. For example, if the controlled access region 265, illustrated in FIG. 2, will contain a legal disclaimer that must be on all pages of a given electronic document, the document author may prohibit all subsequent access to that controlled access region.

Figure 3:
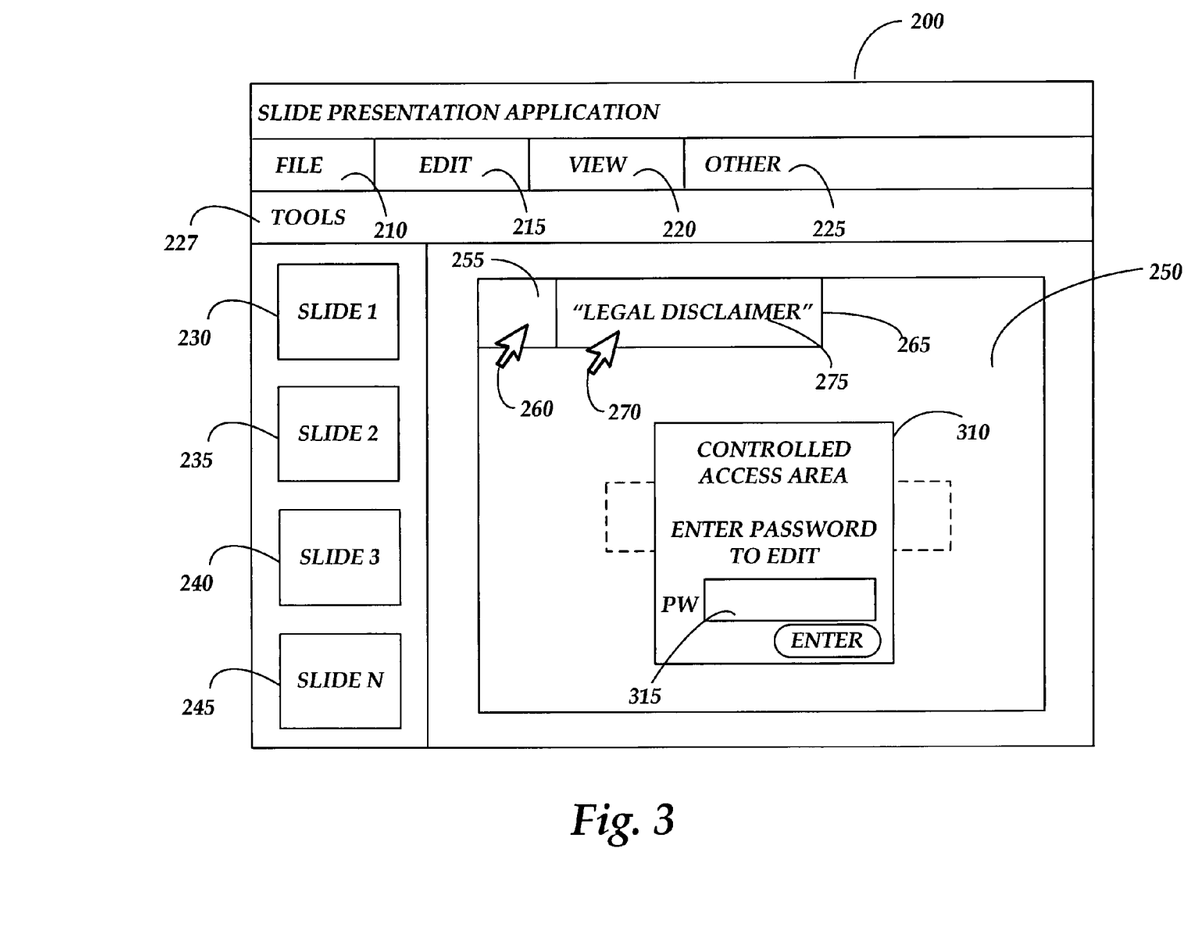
FIG. 3 illustrates a computer screen display of an example slide presentation application user interface for showing operation of an embodiment of the present invention.

Alternatively, the document author and/or manager may set access properties on a given controlled access region for allowing designated persons to access the region via a password control. For example, the document author may designate that one or more users may access a given controlled access region upon presentation of a valid password for making changes to data or objects contained in the controlled access region. Referring to FIG. 3, an example legal disclaimer is illustrated in the controlled access region 265. If access to the region 265 has been granted to certain users upon the provision of a valid identification credential, such as a password, a password dialog 310 may be deployed when a user selects the controlled access region 265 for editing its contents. That is, if the user selects the controlled access region 265, the dialog box 310 may be deployed for receiving a password in the password entry box 315. Once the user submits a password, and the password is determined to be valid, the user will then have access to the controlled access region 265 for making allowable changes to the data or objects contained in the region 265. As should be appreciated, if the user is not able to enter a valid password, then access to the contents or objects contained in the region 265 will be denied.

As should be understood, other means of identification may be utilized instead of a password. For example, access to controlled access regions may be granted based on login permissions. That is, certain users may be provided permissions to access certain controlled access regions of a given document that has been launched after properly logging into a company or institution network. As should be appreciated, any number of mechanisms may be used for requiring identification credentials by users having access to certain controlled access regions. In addition, hardware mechanisms such as card readers, fingerprint readers and the like may be utilized for receiving identification credentials from a user desiring access to a designated controlled access region.

Referring back to FIG. 2, a next property that may be set on a designated controlled access region includes a limitation on application functionalities that may be used on contents or objects contained in a designated controlled access region. If the document author and/or manager selects the "Set Functionality Properties" button 290, the document author may be presented with an additional dialog box or menu containing various functionality properties that may be set on the designated controlled access region. For example, the document author and/or manager may be allowed to disable or limit the use of various functionalities available from the software application in use on the electronic document 250. For example, if the software application in use is a word processing document, the document author/manager may set functionality properties that prohibit the ability of a subsequent user to change formatting properties applied to a text entry in a controlled access region. For another example, a functionality property may be set on a given controlled access region to prohibit copying the contents or objects contained in a controlled access region. For another example, functionality properties may be set on a controlled access region that allows a subsequent user to change formatting properties on the contents of the region, but prohibits the user from deleting or adding text or objects to the controlled access region.

According to one embodiment, any functionality button or control in a toolbar or menu of buttons or controls that is disabled by the setting of a functionality property on a controlled access region may be "grayed-out" or otherwise identified to indicate that the associated functionality is disabled. As should be appreciated, any number of functionality limitations may be set on the contents or objects of a designated controlled access region according to embodiments of the present invention described herein. In addition, as should be appreciated, the buttons and controls illustrated in the menu 280 and the layout and location of the menu 280 are for purposes of example only and are not limiting of the number and/or types of buttons or controls that may be utilized for setting one or more properties on a given controlled access region.

Referring still to FIG. 2, a third property that may be set on a designated controlled access region includes one or more identification properties. According to this embodiment, if the document author and/or manager selects the "Set Identification Properties" button 295, the document author and/or manager may be provided with a dialog box or menu to provide the document author and/or manager with one or more identification properties that may be set on a designated controlled access region. For example, one property that may be set on a given region may cause the region to be visible to subsequent users, but color-coded (e.g., "grayed-out") to indicate that region is not accessible to subsequent users or to distinguish the controlled access region from a non-controlled access region of the document. Another example identification property that may be set on a given region may cause an opaque screen or covering to be displayed over a designated controlled access region so that the contents of the region are not visible to subsequent users. According to another identification property, the region may be grayed-out or covered when a subsequent user selects the region or otherwise focuses on the region, for example, by hovering a mouse cursor over the region.

In addition, a property may be set on a controlled access region that causes an alert, for example, a pop-up dialog, to be deployed to a subsequent user upon selection or focus on the region to distinguish the controlled access region from a non-controlled access region or to provide the user with information about the region. For example, a pop-up dialog may be presented to a subsequent user that informs the user that the selected area or object is a controlled access region and that the user may not make changes to contents or objects contained in the region. An example of such a pop-up dialog is the previously described password dialog 310, illustrated in FIG. 3. In addition, a pop-up dialog or other user interface component may be deployed upon selection of a controlled access region for providing helpful information regarding the access control properties applied to the region or for providing access to help functionality. For example, referring to FIG. 5, a pop-up dialog 530 is provided in proximity to a selected controlled access region 415 that provides a comment "this area should include the title, date, and participants" for informing a user as to information that should be provided in the associated region. In addition, buttons or controls may be provided in the pop-up dialog 530 for allowing a user to selectively receive help functionality for learning how to properly use, access, or change contents or objects contained in the region.

Figure 4:
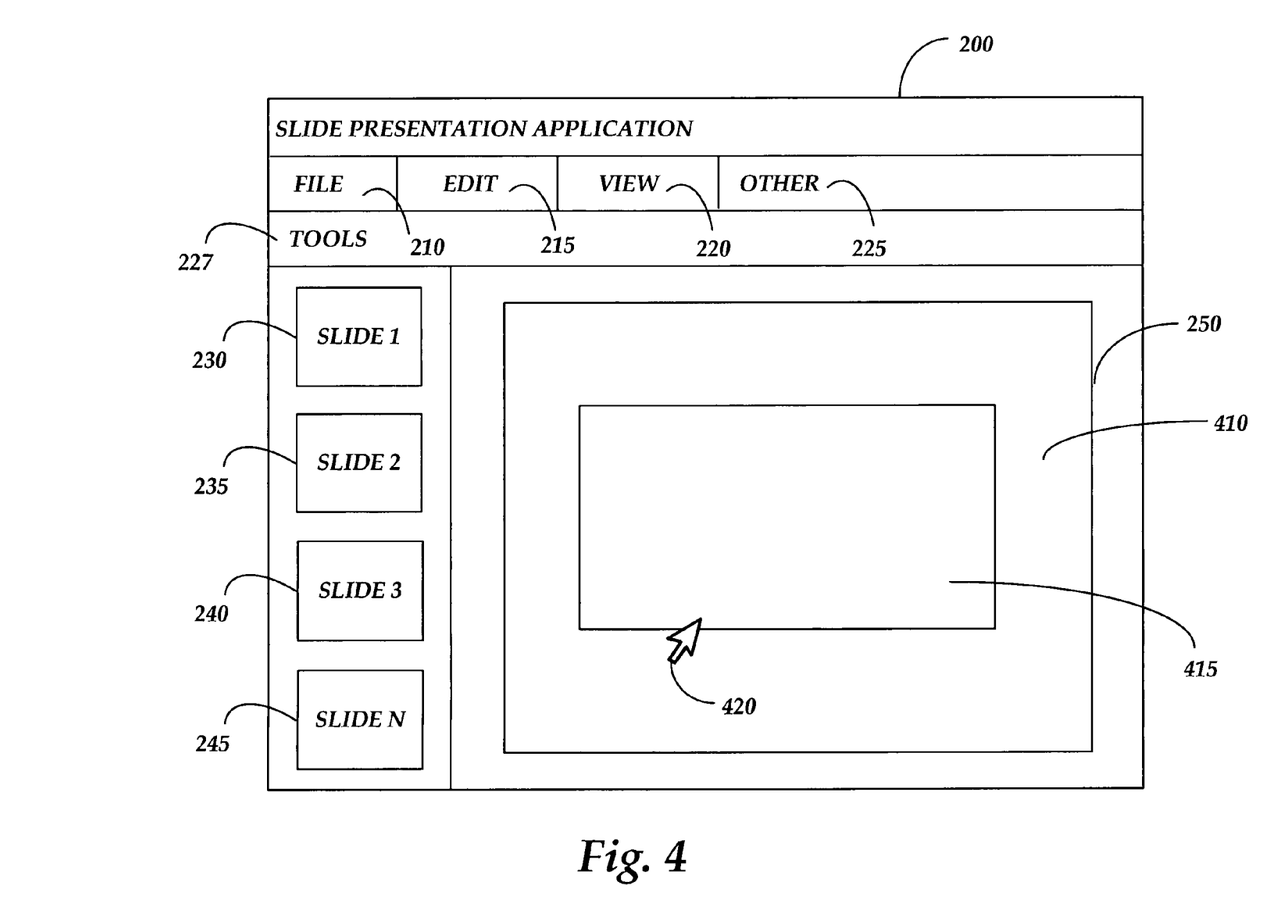
FIG. 4 illustrates a computer screen display of an example slide presentation application user interface for showing operation of an embodiment of the present invention.
Figure 5:
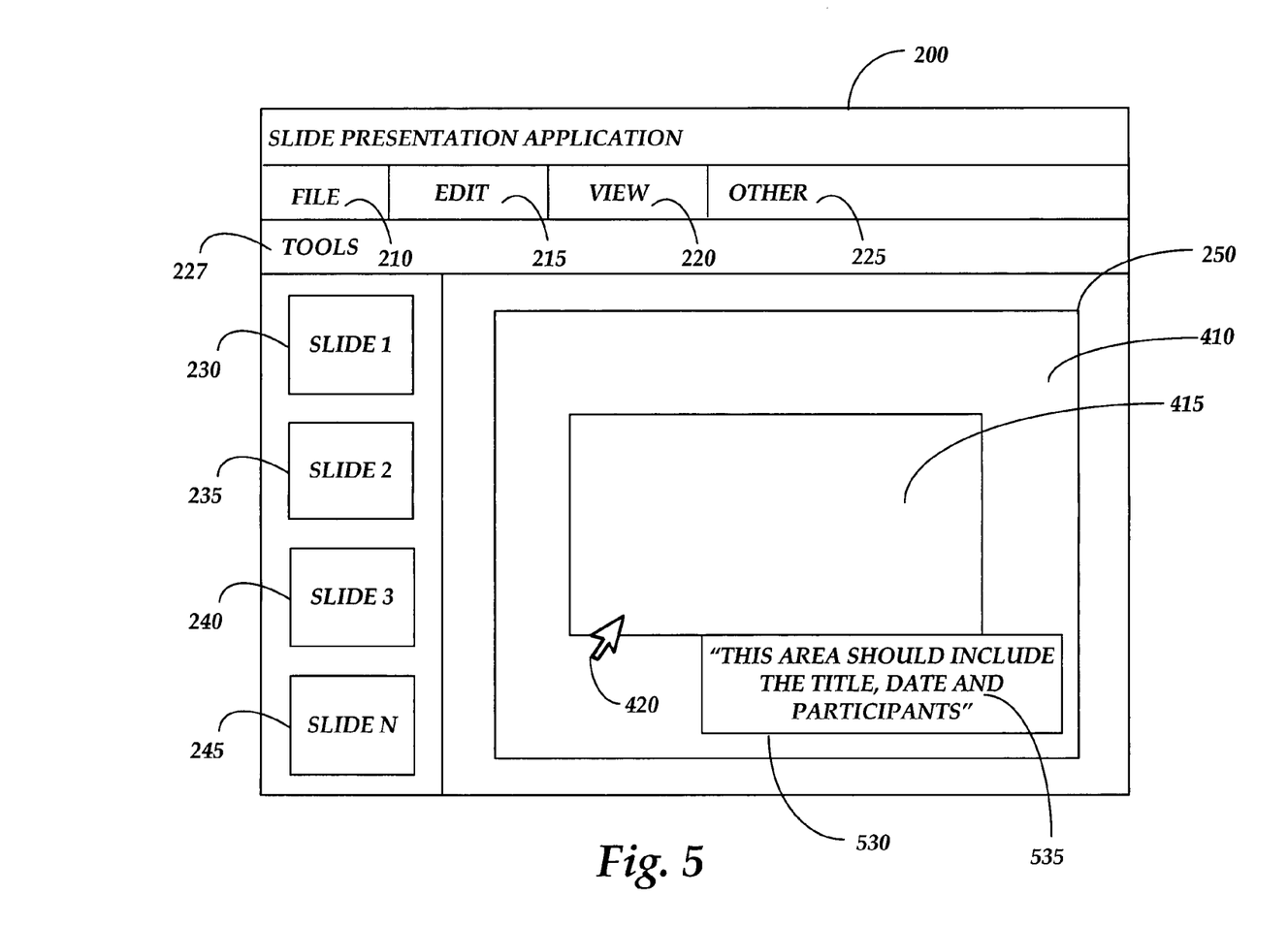
FIG. 5 illustrates a computer screen display of an example slide presentation application user interface for showing operation of an embodiment of the present invention.

As described above, the controlled access regions 255, 265, illustrated in FIGS. 2 and 3, represent "negative" space. That is, those regions represent space in the associated electronic document 250 that may not be accessed by subsequent users or for which access and functionality are limited. Referring now to FIGS. 4 and 5, according to an alternative embodiment, a controlled access region may be designated as "positive" space, which is space in an associated electronic document to which subsequent users may have access and in which subsequent users may utilize application functionality on data or objects contained in the region. As illustrated in FIG. 4, the electronic document 250 includes a region 410 and a region 415. According to this embodiment, the region 415 is drawn or otherwise selected by a document author and/or manager and is designated as a "positive" controlled access region. That is, the region 415 may be accessed by subsequent users, and subsequent users may utilize application functionality on data or objects contained in the region 415. On the other hand, the region 410 outside the controlled access region may not be accessible by subsequent users if desired by the document author and/or manager.

According to this embodiment, the document author/manager may select one or more particular areas or objects of an associated electronic document and designate that only those selected areas or objects may be accessed by or operated on by subsequent users. As described above with reference to FIGS. 2 and 3, a number of properties including access privileges, functionality properties, and identification properties may be applied to the controlled access region 415 for specifying those users who may access the region and the types of functionality and identification properties applicable to the region. Referring to FIG. 5, as described above, a dialog box 530 is illustrated for providing helpful information to a user as to the contents that should be included in a designated controlled access region 415. As should be understood, access, functionality, and identification properties may also be applied by the document author/manager to the "negative" space 410 surrounding the controlled access region 415.

According to embodiments of the present invention, once a controlled access region is designated, as described above with reference to FIGS. 2, 3, 4 and 5, the region may be moved from one location in an electronic document to another location. For example, referring back to FIG. 2, if it is desired that the controlled access region 265, for example, a legal disclaimer region, be moved to the lower right-hand corner of the electronic document 250, the document author and/or manager may move the controlled access region to the desired location through well-known methods such as drag and drop by selecting the desired controlled access region and dragging it to a desired location. According to this embodiment, any access, functionality or identification properties applied to the controlled access region are moved with the controlled access region to the new location. As should be appreciated, one of the functionality properties set for a given controlled access region may include movement of the controlled access region. That is, if a document author and/or manager desires that a given controlled access region not be moved by subsequent users, one functionality that may be disabled with respect to the region is the functionality allowing the region to be moved, as described herein.

In addition, if a portion of an electronic document, for example, a paragraph, page, slide, spreadsheet, and the like, is copied for pasting into a different location in the document, or to a different document altogether, any controlled access regions designated in the copied portion are copied with the copied portion and may be pasted to the new location such that the copied controlled access regions and the associated properties applied to the copied controlled access regions are pasted to the new location. For example, if the slide document 250, illustrated in FIG. 2, is copied from the associated slide presentation and is pasted to a different slide presentation, the controlled access regions 255 and 265 along with the contents of those regions and any properties applied to those regions by the original document author and/or manager are pasted to the new location. As should be appreciated, however, if the original document author/manger sets a property on a given controlled access region to disable or limit the ability of a subsequent user to copy a given controlled access region, then the controlled access region may not be copied and pasted to a different document or document location.

According to embodiments of the invention, controlled access regions of an electronic document, may be established as regions in which prescribed application functionality is applied apart from controlling user access to such regions. For example, a given controlled access region may be defined for automatically receiving a prescribed layout of content by an application with which the document containing the controlled access region is being created or edited. For example, a given controlled access region may be designated for containing legal information such as copyright information. Upon launching the document, the application may parse the document to determine whether certain areas require prescribed content layout or other treatment. For the example copyright region, the application may automatically populate the region with a template for filling in copyright information by the user.

In addition, properties may be set on a given controlled access region for providing additional user interface components or functionality for a designated region. For example, a third party add-in software component may be added to the application in use for providing specialized functionality for a designated region. For example, a given region may be designated for containing specialized footnotes or endnotes. Upon selection of such a region, additional functionality, for example, specialized footnotes functionality, may be provided to the user and additional user interface components may be dynamically presented to the user for using the additional functionality on the designated region. As should be understood, regions designated for application of specialized software functionality may also be controlled with respect to access by users as described above with reference to FIGS. 2-5.

As described herein, areas or objects of an electronic document may be designated as controlled access regions for prohibiting or limiting access and/or application of certain functionalities to those regions. It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A method of controlling editing access to a region in electronic slides, the method comprising:

receiving, by a computing device, a selected area of a first electronic slide of a first slide presentation for designation as a controlled access region;

providing, in response to receiving the selected area of the first electronic slide for designation as the controlled access region, a user interface for setting at access control properties for the selected area of the first electronic slide, wherein the user interface comprises:

a first portion for setting access privileges for the selected area of the first electronic slide, a second portion for limiting application functionalities that are operative with the selected area of the first electronic slide, a third portion for setting identification properties of the selected area of the first electronic slide, wherein setting the identification properties comprises setting a visual presentation of the controlled access region, the visual presentation comprising a color-coding of the controlled access region;

designating, by the computing device, the selected area as the controlled access region;

controlling, by the computing device, editing access to the controlled access region;

receiving a request to copy the controlled access region to a second electronic slide of a second slide presentation;

when at least one access control property associated with the controlled access region permits copying and pasting of the controlled access region of the first electronic slide:

copying the controlled access region of the first electronic slide, wherein copying the controlled access region of the first electronic slide comprises copying all access control properties associated with the controlled access region in the first electronic slide, and pasting the controlled access region to the second electronic slide, wherein pasting the controlled access region to the second electronic slide comprises pasting all of the access control properties associated with the copied controlled access region in the first electronic slide to the pasted controlled access region in the second electronic slide; and in response to copying and pasting the controlled access region of the first electronic slide to the second electronic slide, controlling editing access to the controlled access region in the second electronic slide based on the associated control properties of the controlled access region copied from the first electronic slide.

2. The method of claim 1, further comprising:
selecting the controlled access region; and
preventing editing access to any content contained in the controlled access region.

3. The method of claim 1, further comprising:
selecting the controlled access region; and
limiting editing access to any content contained in the controlled access region.

4. The method of claim 1, further comprising:
selecting the controlled access region; and
providing an alert that editing access to the selected controlled access region is limited.

5. The method of claim 1, further comprising:
applying a software application functionality to at least one content item contained in the controlled access region; and
limiting the application of the selected software application functionality to the at least one content item contained in the controlled access region.

6. The method of claim 1, further comprising:
selecting the controlled access region; and
automatically providing at least one software functionality designated for use in association with the selected controlled access region.

7. The method of claim 1, wherein selecting the area of the electronic slide for designation as the controlled access region includes receiving a selection of an object contained in the first electronic slide for designation as the controlled access region.

8. The method of claim 1, wherein designating the selected area as the controlled access region includes receiving an application of the at least one access control property to the controlled access region.

9. The method of claim 8, wherein controlling editing access to the controlled access region includes controlling editing access to the controlled access region according to the at least one access control property applied to the controlled access region.

10. The method of claim 8, wherein receiving the application of the at least one access control property to the controlled access region includes receiving the at least one access control property for specifying a type of access to the controlled access region that is allowed.

11. The method of claim 10, wherein receiving the at least one access control property for specifying the type of access to the controlled access region that is allowed includes receiving the at least one access control property for specifying that no access to the controlled access region is allowed.

12. The method of claim 10, wherein receiving the at least one access control property for specifying the type of access to the controlled access region that is allowed includes receiving the at least one access control property for specifying that access to the controlled access region is allowed to at least one prescribed user.

13. The method of claim 12, wherein specifying that access to the controlled access region is allowed to the at least one prescribed user includes specifying that access to the controlled access region is allowed to the at least one prescribed user in response to receipt of a valid identification credential from the at least one prescribed user.

14. The method of claim 8, further comprising in response to receiving the at least one access control property for specifying the type of access to the controlled access region, limiting the application of at least one software application functionality to a content item contained in the controlled access region.

15. The method of claim 8, wherein receiving the at least one access control property for specifying the type of access to the controlled access region includes receiving an application of at least one identification property to the controlled access region for distinguishing the controlled access region from a non-controlled access region.

16. The method of claim 15, wherein receiving the application of the at least one identification property to the controlled access region includes receiving an application of a color-coding of the controlled access region for distinguishing the controlled access region from the non-controlled access region.

17. The method of claim 15, wherein receiving the application of the at least one identification property to the controlled access region includes overlaying the controlled access region with an opaque covering for distinguishing the controlled access region from the non-controlled access region.

18. The method of claim 15, wherein receiving the application of the at least one identification property to the controlled access region includes displaying an alert for distinguishing the controlled access region from the non-controlled access region.

19. A computer-readable storage device comprising a set of instructions which when executed by a computer perform a method of controlling editing access to a region in electronic slides, the method comprising the steps of:

receiving a selected area of a first electronic slide of a first slide presentation for designation as a controlled access region, wherein receiving the selected area comprises receiving the selection from a pointing device drawing a box around the area to be designated as the controlled access region;

providing, in response to receiving the selected area of the first electronic slide for designation as the controlled access region, a user interface for setting access control properties for the selected area of the first electronic slide, wherein the user interface comprises:

a first portion for setting access privileges for the selected area of the first electronic slide, a second portion for limiting application functionalities that are operative with the selected area of the first electronic slide, a third portion for setting identification properties of the selected area of the first electronic slide, wherein setting the identification properties comprises setting a visual presentation of the controlled access region, the visual presentation comprising a color-coding of the controlled access region;

designating the selected area as the controlled access region, wherein designating the selected area as the controlled access region includes receiving an application of at least one control property to the controlled access region;

receiving a request to copy the controlled access region to a second electronic slide of a second slide presentation;

when copying the controlled access region is permissible based on the at least one access control property of the controlled access region, copying the controlled access region to the second electronic slide, wherein copying the controlled access region to the second electronic slide comprises copying all access control properties associated with the controlled access region in the first electronic slide, the control properties being associated with at least one of the following:

formatting the controlled access region, copying the controlled access region, coloring the controlled access region, appending to the controlled access region, and deleting from the controlled access region;

pasting the controlled access region to the second electronic slide, wherein pasting the controlled access region to the second electronic slide comprises pasting all of the access control properties associated with the copied controlled access region in the first electronic slide to the pasted controlled access region in the second electronic slide; and in response to copying and pasting the controlled access region of the first electronic slide to the second electronic slide, controlling editing access to the controlled access region in the second electronic slide, wherein controlling editing access to the controlled access region in the second electronic slide comprises controlling editing access to the controlled access region based on the associated control properties of the controlled access region copied from the first electronic slide.

* * * * *